United States Patent [19]
Faye et al.

[11] Patent Number: 4,867,346
[45] Date of Patent: Sep. 19, 1989

[54] DISPENSER FOR REACTIVE CHEMICALS

[75] Inventors: Robert Faye, Chester; David E. Henderson, Richmond, both of Va.

[73] Assignee: International Packaging Systems Incorporated, Richmond, Va.

[21] Appl. No.: 101,412

[22] Filed: Sep. 28, 1987

[51] Int. Cl.⁴ ............................................. B67D 5/56
[52] U.S. Cl. ................................. 222/145; 222/135; 222/149; 222/504; 239/123; 239/413
[58] Field of Search ............ 239/407, 413, 414, 416.1, 239/123; 222/135, 145, 148, 149, 504

[56] References Cited

U.S. PATENT DOCUMENTS

| | | |
|---|---|---|
| 1,281,960 | 10/1918 | Hills . |
| 1,319,006 | 10/1919 | Kimball . |
| 1,332,544 | 3/1920 | Davis . |
| 1,960,724 | 5/1934 | Bramsen . |
| 1,969,205 | 8/1934 | Carr et al. . |
| 2,204,310 | 6/1940 | Holmquist . |
| 2,764,995 | 10/1956 | Krupp et al. . |
| 2,890,836 | 6/1959 | Gusmer et al. . |
| 3,092,469 | 6/1963 | Jaffe et al. . |
| 3,144,210 | 8/1964 | Levy . |
| 3,192,941 | 7/1965 | Tyhurst . |
| 3,221,937 | 12/1965 | Kamborian . |
| 3,236,495 | 2/1966 | Buchholz . |
| 3,246,665 | 4/1966 | Fessler, Jr. et al. . |
| 3,263,928 | 8/1966 | Gusmer . |
| 3,290,003 | 12/1966 | Kessler . |
| 3,291,396 | 12/1966 | Walter . |
| 3,363,337 | 1/1968 | Brooks et al. . |
| 3,379,376 | 4/1968 | Williams et al. . |
| 3,417,923 | 12/1968 | Carlson . |
| 3,504,855 | 4/1970 | Volker . |
| 3,557,820 | 1/1971 | Jackson . |
| 3,633,607 | 1/1972 | Werra . |
| 3,687,370 | 8/1972 | Sperry . |
| 3,690,556 | 9/1972 | McCain . |
| 3,784,110 | 1/1974 | Brooks . |
| 3,799,199 | 3/1974 | Rumpff . |
| 3,908,862 | 9/1975 | Chandra et al. . |
| 3,930,619 | 1/1976 | Levey et al. . |
| 4,023,733 | 5/1977 | Sperry . |
| 4,043,486 | 8/1977 | Wisbey . |
| 4,083,474 | 4/1978 | Waite et al. . |
| 4,108,606 | 8/1978 | Wingard . |
| 4,115,299 | 9/1978 | Muhle . |
| 4,123,007 | 10/1978 | Gardner . |
| 4,189,070 | 2/1980 | Macosko et al. . |
| 4,196,160 | 4/1980 | Sperry . |
| 4,224,959 | 9/1980 | Fling . |
| 4,226,543 | 10/1980 | Schluter . |
| 4,263,166 | 4/1981 | Adams . |
| 4,302,550 | 11/1981 | Pisaric et al. . |
| 4,311,254 | 1/1982 | Harding . |
| 4,344,919 | 8/1982 | Kelterbaum . |
| 4,377,256 | 3/1983 | Commette et al. . |
| 4,426,023 | 1/1984 | Sperry et al. . |
| 4,471,887 | 9/1984 | Decker ............................... 222/145 |
| 4,523,696 | 6/1985 | Commette et al. .................. 222/135 |
| 4,568,003 | 2/1986 | Sperry et al. ........................ 222/145 |

FOREIGN PATENT DOCUMENTS 8606654 11/1986 PCT Int'l Appl. ................. 222/149

Primary Examiner—H. Grant Skaggs
Assistant Examiner—Steven M. Reiss
Attorney, Agent, or Firm—Curtis, Morris and Safford

[57] ABSTRACT

A mixing and dispensing apparatus for mutually reactive chemicals. The apparatus includes a mixing chamber having a core of inexpensive monolithic design with a reciprocal. The core and purging rod are readily detachable as a unit from the remainder of the apparatus. The purging rod does not perform a valving function, and therefore significant compressive force does not need to be maintained on the mixing chamber core. The apparatus includes separate valves for each of the reactive components remote from the mixing chamber bore which are automatically opened after retraction of the purging rod, so that the chemicals are not maintained under pressure adjacent the purging rod. A visible indication of the amount of useful life remaining for the mixing chamber is also provided.

21 Claims, 5 Drawing Sheets

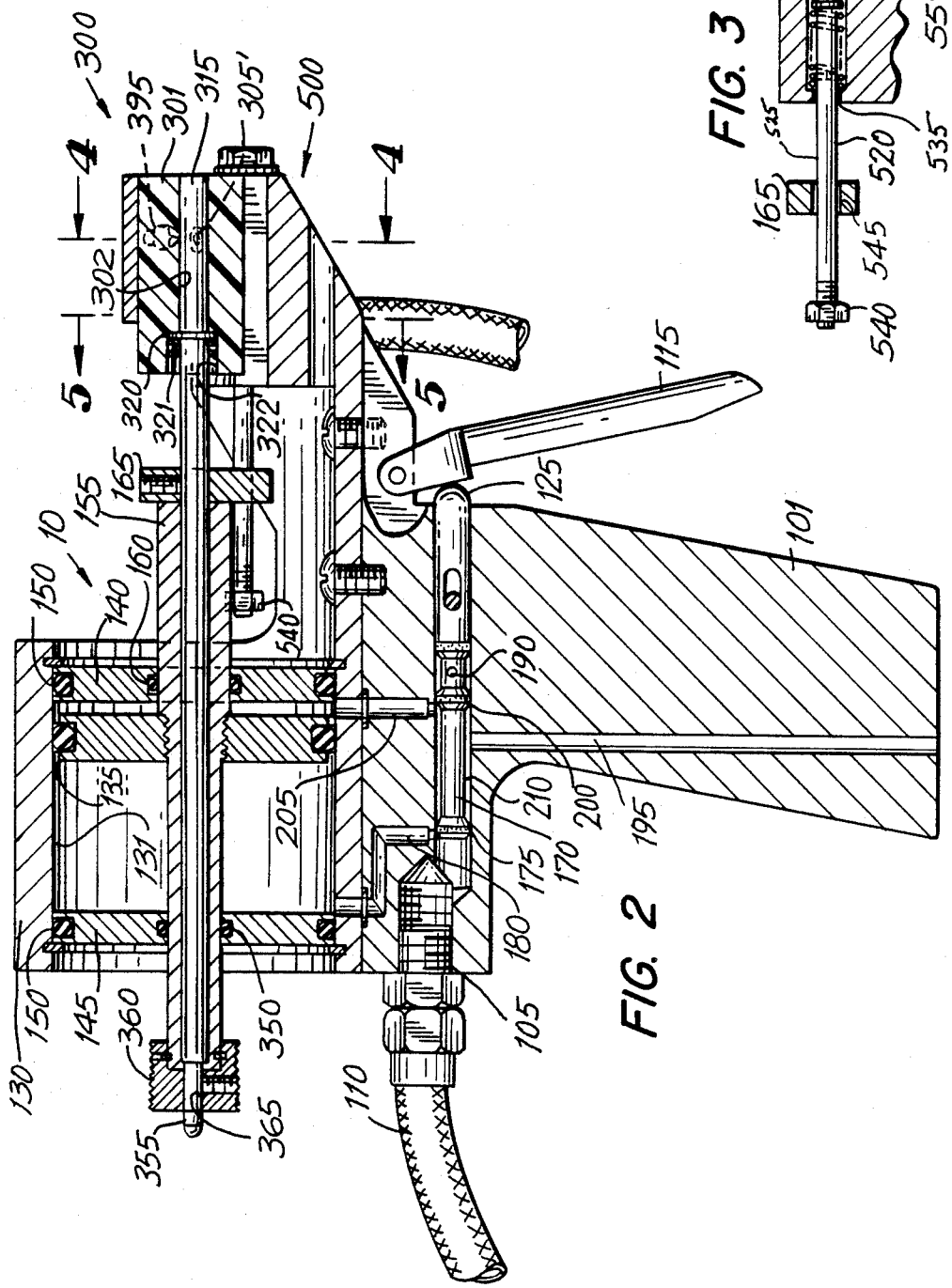

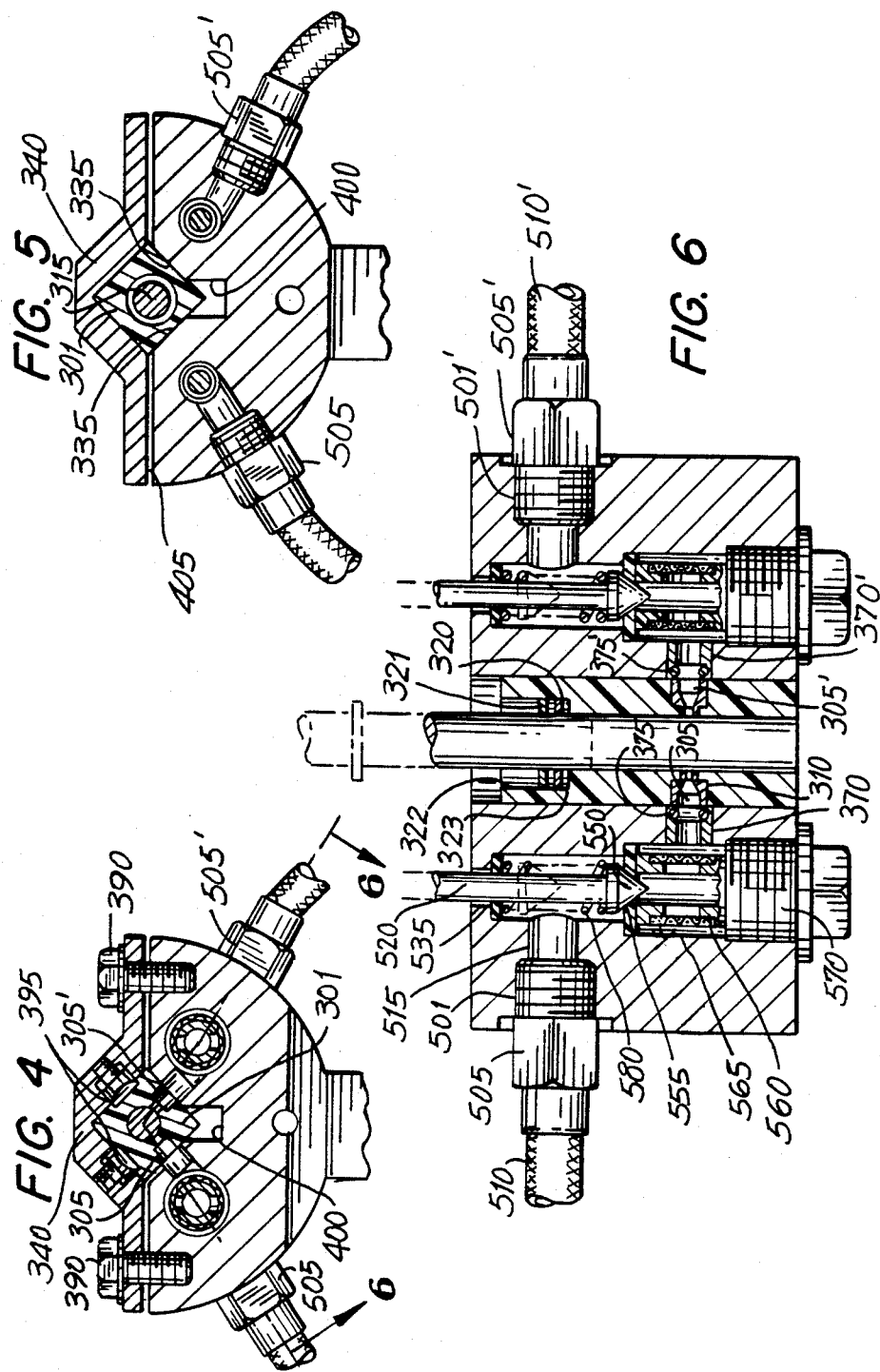

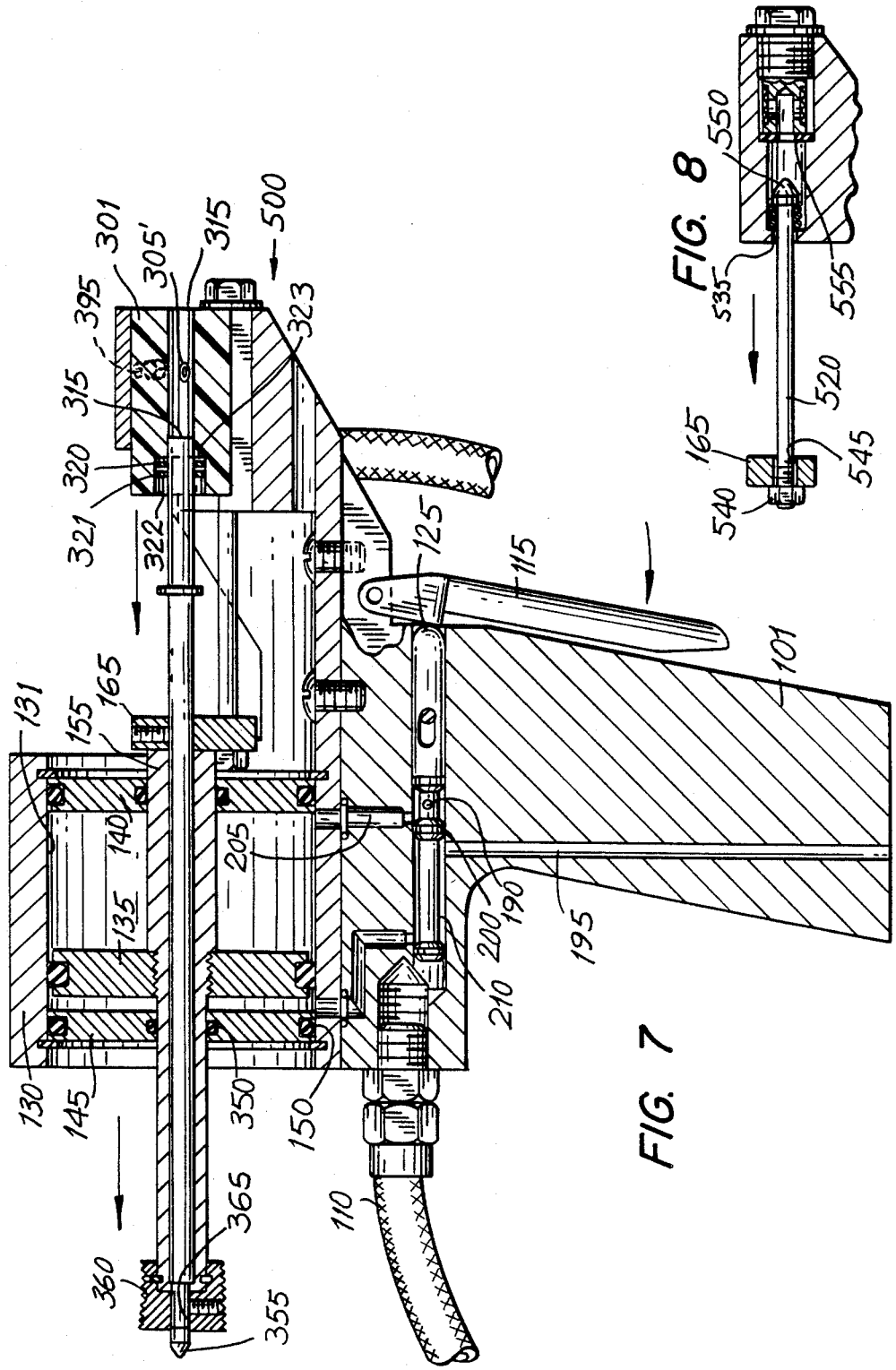

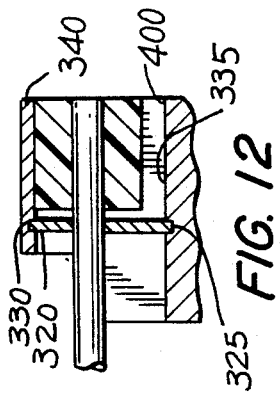
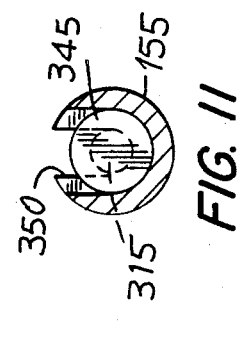
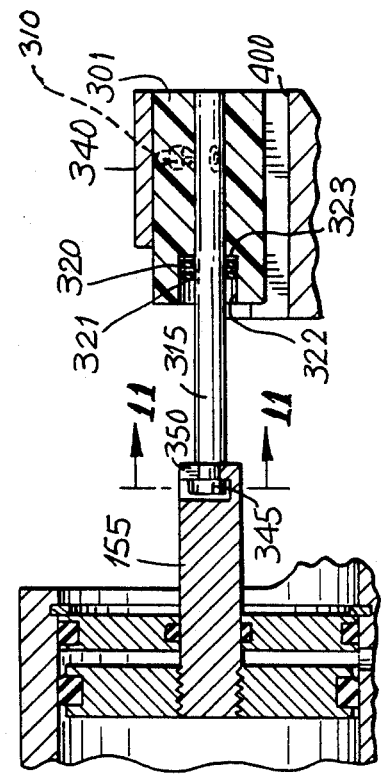

DISPENSER FOR REACTIVE CHEMICALS

FIELD OF THE INVENTION

This invention relates generally to apparatus for mixing and dispensing a plurality of reactive chemicals, and in particular to an apparatus for mixing and dispensing polyurethane precursor chemicals used to make polyurethane foam and coatings.

BACKGROUND OF THE INVENTION

There has come into general use a class of synthetic polyurethane which is formed by the reaction of two highly reactive chemicals, typically an organic resin and a polyisocyanate. These chemicals are relatively stable when alone, but when mixed in the proper proportion, react within a very few seconds to form a polyurethane foam.

Polyurethane foam can be used in a variety of applications, including insulation and foam-in-place cushioned packaging material. The fast reaction and setting of the chemicals to form the polyurethane foam is highly desirable from the standpoint of high production rates of the foam, but reaction of the chemicals inside the dispensing equipment can clog and jam the internal parts of the dispensing equipment, rendering the equipment inoperative.

To alleviate some of the problems of mixing and dispensing of polyurethane foam precursor chemicals, several different approaches to the design of dispensing equipment for polyurethane foams have been suggested.

A type of polyurethane foam dispensing equipment in wide use is exemplified in U.S. Pat. No. 3,263,928. The device disclosed in this patent includes a mixing chamber assembly having a polytetrafluoroethylene (available as "Teflon" from DuPont Corporation) core circumferentially and axially contained within a metallic housing. The Teflon core has an axial bore therethrough with individual inlets therein for the injection of the reactive chemicals from respective sources of supply into the bore and a valving rod reciprocally movable within the bore. The Teflon core is maintained under a compressive force by a threaded nut disposed at the rear of the mixing chamber core to keep an interference fit between the valving rod and the Teflon core to maintain proper sealing of the valving rod with the inlets.

The valving rod is connected to an air piston which is actuated by means of a trigger. When the trigger is depressed, the valving rod is reciprocated back to uncover the inlets, thereby allowing entry of the reactive chemicals into the bore for mixing and dispensing out the front of the bore. After the desired quantity of the mixture has been dispensed, the rod is reciprocated forward to close off the ports to prevent further entry of the reactive chemicals into the bore. The valving rod is then moved still forward to the end of the bore so as purge any mixed chemicals which remain in the mixing chamber bore.

This design has met with a limited degree of success, but has many drawbacks. Despite the interference fit between the valving rod and the bore, as the valving rod is actuated a number of times, a gradual build-up of reacted polyurethane material on the valving rod occurs. Even though Teflon is an inherently low friction material, as polyurethane is built-up on the valving rod, the friction between the valving rod and the core may increase to the point where the valving rod becomes jammed in the bore and cannot be reciprocated by the air cylinder. When this happens, the dispensing equipment is rendered inoperative and must be disassembled and cleaned to free the valving rod. In time, the Teflon core itself may become unserviceable due to wear. In this case, after removal of the valving rod from the Teflon core, the Teflon core itself must be removed from the housing and replaced, which is a laborious process. During such repair, the apparatus is unusable.

Other proposals for minimizing jamming of the valving rod in the bore are disclosed in U.S. Pat. Nos. 3,687,370 and 4,023,733. These dispensing devices have a Teflon mixing chamber core with a bore therethrough fitted into a metallic housing. The disclosed devices also includes a valving rod tightly fitted into the bore and reciprocal to selectively seal or open the ports, similar to the operation shown in U.S. Pat. Nos. 3,263,928, except without means for axially compressing the Teflon core.

The devices disclosed in U.S. Pat. Nos. 3,687,370 and 4,023,733 propose to minimize jamming by means of a reservoir containing a solvent material positioned behind the mixing chamber. When the rod is reciprocated to the rearward position, the back of the rod is bathed in the solvent, which acts to prevent the reaction of the precursor chemicals and dissolve built-up polyurethane, which is said to reduce the tendency of the valving rod to jam in the Teflon mixing chamber. However, jamming can still occur, and such jams necessitate disassembly and cleaning of the equipment. In some cases, the jamming may be so serious as to require removal and replacement of the Teflon core from the housing, which is a time consuming and laborious process requiring special equipment. During such repair or replacement, the apparatus is unusable. Furthermore, the solvent itself is toxic.

U.S. Pat. Nos. 4,469,251 and 4,568,003 disclose a dispensing device having a detachable mixing chamber assembly. The mixing chamber assembly has a Teflon core having a bore and a valving rod in an interference fit in the bore, similar in function and operation to the device disclosed in U.S. Pat. No. 3,263,928. The Teflon core is axially and circumferentially retained in a nondeformable housing, which is also part of the detachable mixing chamber assembly. This housing axially and radially contains and compresses the Teflon core to maintain the interference fit.

Belleville spring washers are also provided at one end of the housing to maintain the Teflon under a compressive force. This, it is said, maintains the interference fit between the valving rod and the bore so as to maintain an effective seal between the valve and the bore to prevent leakage. These patents further teach use of nondeformable inserts in the inlets to maintain the shape of the inlets during use. However, jamming may still occur, and in this event, the mixing chamber, and hence the device, becomes unusable.

The devices disclosed in U.S. Pat. Nos. 4,469,251 and 4,568,003 have two separable portions. One portion includes a mixing chamber assembly, including the nondeformable housing, Teflon core, nondeformable inserts, valving rod and Belleville washers; and another portion includes means for reciprocating the valving rod. When the mixing chamber assembly becomes jammed or otherwise fails to function, the entire mixing chamber assembly, including the nondeformable housing, Teflon core, nondeformable inserts, valving rod and Belleville washers, is removed from the other portion of the apparatus and replaced with a fresh assembly.

While ostensibly an improvement over the type of dispenser disclosed in U.S. Pat. Nos. 3,263,928; 3,687,370 and 4,023,733, the apparatus disclosed in these patents has serious disadvantages. Use of a reciprocal rod in the bore of the Teflon core as the valving means for the inlets is undesirable. Because the chemicals are maintained under pressure directly adjacent the valving rod, unless the core is kept under a high compressive force to maintain a tight interference fit between the valving rod and the bore, the chemicals have a tendency to leak around the valving rod when the valving rod is in the forward position, causing premature reaction of the chemicals and thus contributing to jamming and clogging of the inlets. Furthermore, the relatively high compression necessary to maintain sealing of the valving rod in the Teflon core increases the friction between the valving rod and the Teflon core, and thus the force required to reciprocate the valving rod in the bore. Still further, the compression on the core has a tendency to cause the nondeformable inserts in the inlets to back away from the rod to the extent permitted by the nondeformable housing. This can potentially allow the Teflon material of the core itself to extrude underneath the discharge end of the insert to occlude the inlets.

Teflon is also a material which exhibits a tendency to "cold-flow". Thus, Tefon when placed under a compressive force will continue to deform over time. The tight compressive force necessary between the mixing chamber core and the associated valving rod has a tendency to compress the Teflon radially inwardly. In time and after a number of valve rod reciprocations, the inner surface of the core is shaved somewhat, destroying the integrity of the tight interference fit.

Furthermore, the mixing chamber assembly with its non-deformable housing, Belleville washer assembly for maintaining the Teflon core under compression, Teflon core, nondeformable inserts and valving rod is relatively expensive. Discarding the entire mixing chamber assembly is undesirable because of the expense, particularly since the failure is usually confined to only the Teflon core itself and valving rod (which are themselves inexpensive). However, because the Teflon core is tightly contained within the circumferential housing, removal and replacement of the Teflon core and valving rod alone from the housing is difficult and requires special equipment. Still further, the mixing chamber has a limited life, and there is no means of determining when the mixing chamber has nearly reached the end of its useful life. The only way to determine when to replace the mixing chamber assembly is to wait until a failure of some kind, such as jamming or failure to produce acceptable foam, occurs. This is undesirable since failures of any kind occur as unpredictable times and can have costly results.

Another proposed design of reactive chemical device is disclosed in U.S. Pat. No. 4,133,483. This patent discloses a dispensing device having a mixing chamber and inlets for the chemicals leading into the mixing chamber. Separate valves are provided for each inlet, said to be operable substantially simultaneously by a manual hand lever. A purging rod which is operable completely separate from and independent of the valving means for the chemicals is provided to purge out reactive chemical after dispensing is complete, but which is not utilized to open or close the inlets. Because the purging rod is independent of the valving means, it can be operated several times, if necessary, to purge out remaining chemicals without activating the mixing and dispensing operation.

The device disclosed in U.S. Pat. No. 4,133,483 has several disadvantages. It has been found that it is very difficult in practice to effect simultaneous and complete opening of the separate valves with the manual lever because the human hand is too slow. And if the operator only partially depresses the lever, the valve for one chemical may open completely while the other valve opens only partially, resulting in an improper ratio of the mixture. Furthermore, because the purging operation is separate and independent from the valving dispensing operation, a careless operator can forget to purge after dispensing, resulting in a jammed and clogged dispenser.

OBJECTS OF THE INVENTION

Accordingly, it is an object of the present invention to provide a mixing and dispensing apparatus for mutually reactive chemicals which overcomes the foregoing disadvantages.

In particular, it is an object of the present invention to provide a mixing and dispensing apparatus for mutually reactive chemicals which includes a mixing chamber having a core of inexpensive monolithic design with a reciprocal purging rod therethrough, which core and purging rod are readily detachable as a unit from the remainder of the apparatus.

It is a further object of the present invention to provide a mixing chamber having a reciprocal purging rod which does not require a significant compressive force to be maintained on the mixing chamber core.

It is a yet further object of the present invention to provide a dispensing apparatus which includes separate valving means for each of the reactive components, which valves are remote from the mixing chamber bore and which are automatically opened after retraction of the purging rod, so that the chemicals are not maintained under pressure adjacent the purging rod.

It is still a further object of the present invention to provide a mixing chamber having a deformable core with a purging rod therethrough where the inlets for the chemicals have nondeformable liners which are urged against the purging rod.

A still further object of the invention is to provide a mixing chamber and dispensing apparatus for use with reactive chemicals which does not require use of a solvent at all.

A yet further object of the invention is to provide a visible indication of the amount of useful life remaining for the mixing chamber.

SUMMARY OF THE INVENTION

In accordance with one embodiment of the present invention, an apparatus for mixing and dispensing first and second mutually reactive chemicals is provided which has a first body portion and a second body portion.

The first body portion includes a mixing chamber having a front end, a rear end, a longitudinal bore extending completely therethrough, first and second inlets extending into the bore and positioned between the front end and the rear end, each of which have an entrance end and a discharge end. The first body portion further includes a purging rod disposed within the bore.

This rod has a front end and a rearward end and is reciprocal between an extended position wherein the front end of the purging rod extends substantially to the front end of the mixing chamber and a retracted position wherein the front end of the purging rod is retracted rearward of the first and second inlet openings.

The second body portion of the apparatus includes first and second conduits for respectively conducting the first and second chemicals. Each of the first and second conduits has entrance means and exit means for its respective chemical. The entrance means of each conduit includes means for connection to its respective source of supply of the chemicals and the exit means includes means for sealably and readily detachably connecting the exit means to the entrance end of an inlet. First and second valve means are respectively disposed in the first and second conduit means. The second body portion of the apparatus also includes means responsive to the position of the purging rod for opening the first and second valve means upon retraction of the purging rod to a retracted position at a position where the front end of the purging rod is rearward of at least a portion of both of the first and second inlets, means responsive to the position of the purging rod for closing the first and second valve means to close the valves upon extension of the purging rod from the retracted position when the front end of the purging rod is still rearward of at least a portion of both of the first and second inlets, and means for maintaining the first and second valves in the closed condition when the front end of the purging rod is fully forward of the first and second inlets. The second body portion further includes suitable means for reciprocating the purging rod between the retracted position and the extended position.

The apparatus further includes means which are accessible from the outside of the apparatus without disassembly of the apparatus for detachably connecting the purging rod to the reciprocating means and means accessible from the outside of the apparatus without disassembly for detachably connecting the mixing chamber to the second body portion are further provided so that, when the purging rod is disconnected from the reciprocating means, the entire first body portion including both the mixing chamber and the purging rod may be readily detached as a unit from the second body portion.

In a preferred form of this embodiment, the mixing chamber is constructed of a substantially monolithic piece of deformable material.

BRIEF DESCRIPTION OF THE DRAWINGS

The foregoing and other objects, features and advantages of the present invention will become clear upon review of the detailed description and drawings, wherein:

FIG. 2 is a cross-sectional view taken along the line 2—2 of FIG. 1 showing the internal arrangement of the components of the mixing and dispensing apparatus;

FIG. 3 is a detailed cross-sectional view taken along the line 3—3 of FIG. 1 showing the construction of a valve constructed in accordance with one embodiment of the invention;

FIG. 4 is a cross-sectional view taken along the line 4—4 of FIG. 2 showing the arrangement of the valves and mixing chamber;

FIG. 5 is a cross-sectional view taken along the line 5—5 of FIG. 2 showing a portion of the conduits upstream of the valves;

FIG. 6 is a cross-sectional view taken along the line 6—6 of FIG. 4 showing the arrangement of the valves with respect to the conduits and the mixing chamber;

FIG. 7 is a cross-sectional view of one embodiment of the mixing and dispensing apparatus of the present invention, showing one means for removal of the mixing chamber and purging rod from the remainder of the apparatus;

FIG. 8 is a cross-sectional view of one of the valves of the mixing and dispensing apparatus in the open position;

FIG. 9 is an isometric vie of a mixing chamber core and purging rod constructed in accordance with the present invention showing an alternate means of detachable connection of the purging rod to the piston rod of the apparatus;

FIG. 10 is a partial sectional view of the alternate means of attachment of the purging rod to the reciprocating portion of the apparatus; and FIG. 11 is a sectional view of the alternate means of connection of the purging rod to the reciprocating portion of the apparatus, taken along the line 11—11 of FIG. 10; and FIG. 12 is a cross-sectional view of an embodiment of the present invention having a scraper ring behind the mixing chamber.

DETAILED DESCRIPTION

Figure 1:
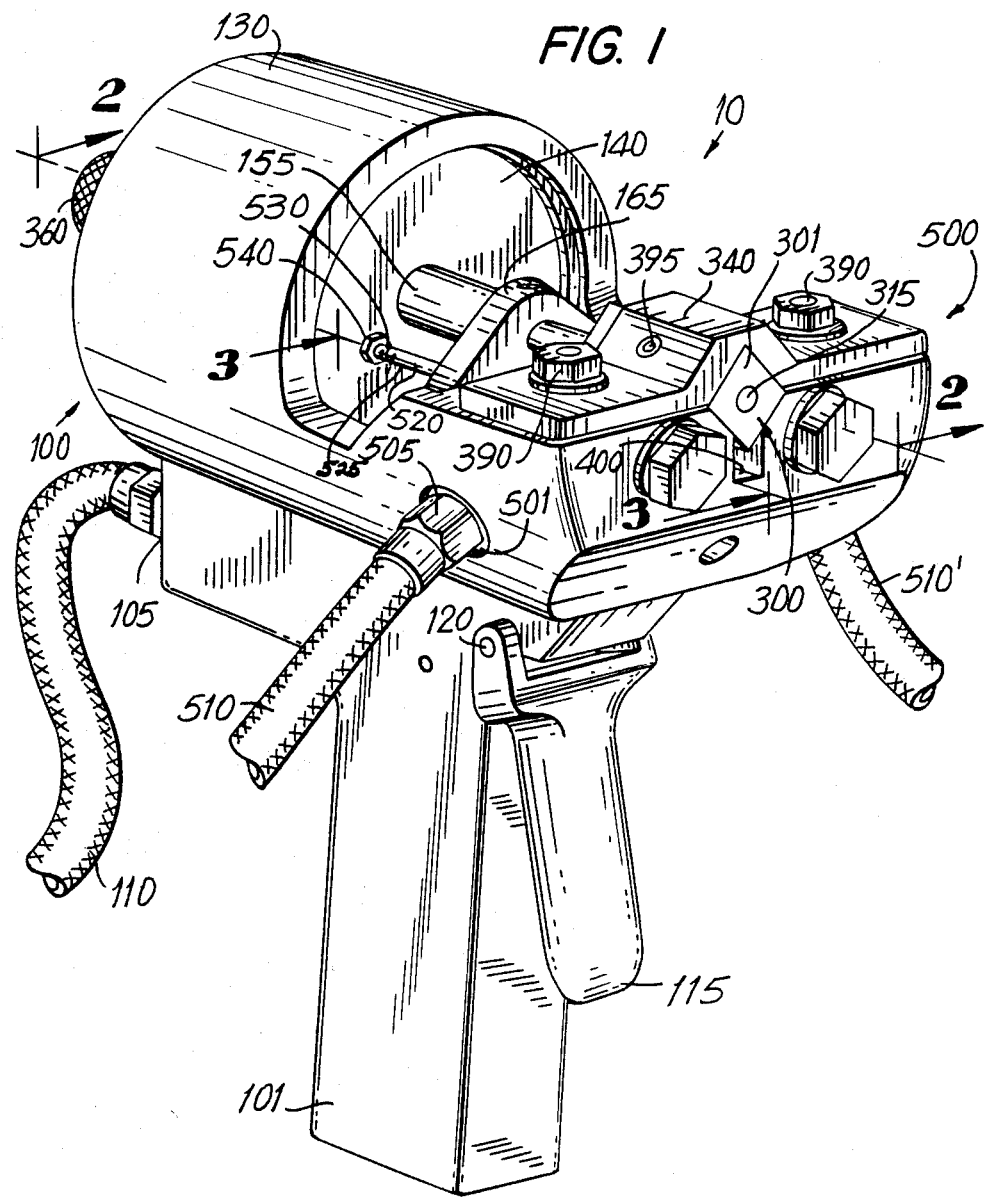
FIG. 1 is an isometric view of a mixing and dispensing apparatus constructed in accordance with one embodiment of the invention.

Referring now to the drawings in detail, and initially to FIGS. 1 and 6, a mixing and dispensing apparatus 10 constructed in accordance with one embodiment of the present invention is illustrated.

The apparatus 10 includes a reciprocating driver portion 100, a chemical valving portion 500, and a mixing chamber portion 300.

The reciprocating driver portion 100 includes a handle 101 which may be readily grasped by an operator. Handle 101 includes a connection 105 for a hose 110 leading to a source of compressed gas, such as air. A trigger 115 is hingeably attached to the handle by means of hinge pin 120. Trigger 115 presses on the exposed end of air valve 125, which controls motion of the air in a manner to be described further in this disclosure.

Reciprocating driver portion 100 further includes an air cylinder 130 with a cylindrical bore 131. A reciprocating air piston 135, not visible in FIG. 1, but shown in cross-section in FIG. 2, fits within the cylindrical bore and is reciprocally slidable in it. The cylinder 130 has a front cover 140 and a rear cover 145 both of which are maintained relatively air tight with respect to cylinder 130 by means of 0-ring seals 150. A piston rod 155 is connected to piston 135 and extends through front cover 140 towards the front of the apparatus. Piston rod 140 is sealed against air leakage where it passes through the front cover by means of an 0-ring seal 160. A valve actuating yoke 165 is attached to the external end of the piston rod 155 and moves with it.

Referring now to FIG. 7, compressed air supplied by means of hose 110 enters the rear of handle 101 and then to a sliding spool valve 170.

When trigger 115 is not depressed, the pressure of the air from hose 110 urges valve 170 forwardly so that seal 175 passes in front of passageway 180 and seal 185 passes in front of passageway 180 leading to the portion of the air cylinder rearward of air piston 135. The rear portion of spool valve 170 is hollow, permitting passage of compressed air through the hollow section and out into the front section of the valve through ports 190. Thus, compressed air then passes through passageway 180 rearwardly of the piston, forcing the piston forward, while simultaneously opening exhaust passageway 195 to permit exit of air from between the piston and the front cover.

When the trigger is depressed, spool valve 170 is slid rearwardly so that seal 200 passes rearwardly of passageway 205 leading to the front of air piston 135. When compressed air enters the air cylinder in front of the air piston, the air piston is forced rearwardly. Simultaneously, this movement causes the rear seal 175 of spool valve 170 to pass rearwardly of rear entrance port 180, allowing air contained within the space between the air piston and the rear cover to exit through the annular space 210 around the spool valve to exhaust passageway 195, and hence to the outside air.

With reference to FIGS. 1, 4, 5 and 6, the mixing chamber portion of the apparatus will now be described.

The mixing chamber portion of one embodiment of the present invention includes core 301, preferably formed of deformable material, with a longitudinal bore 302 through it from the front end to the rear end of the core. Core 301 is preferably constructed of an essentially monolithic piece of Teflon or similar material. Preferably, core 301 is a parallelepiped, with a generally square cross-section.

Core 301 includes two inlets 305 and 305' extending from the exterior surface of core 301 generally radially through the wall of the core into the longitudinal bore. Each of these inlets is oriented generally perpendicular with an exterior face of the Teflon core. Because the inlets are perpendicular to a flat face, forming the inlets in the core is very simple. And, because the core has a generally square cross-section, and the inlets are on adjacent faces, the inlets are offset from each other by 90°. Offsetting the inlets by this amount is believed to assist in prevention of clogging of the inlets. Preferably, inlets 305 and 305' to the mixing chamber are lined with non-deformable liners 310 and 310' to help retain their shape and size.

A purging rod 315 is slidably received into bore 302 and reciprocal within it from an extended position where the front end of purging rod 315 extends to substantially the front end of the mixing chamber core 301 and a retracted position where the front end of the purging rod is rearward of inlets 305 and 305'.

A scraper ring 320 is provided in a rear scraper cavity 322 at the rear of the mixing chamber. Cavity 322 is preferably a longitudinal bore substantially larger than the diameter of the purging rod and substantially coaxial it. The scraper ring has a bore slightly smaller than the diameter of the purging rod so that there is an interference fit between them, and is preferably made from a sturdy material such as steel. The scraper ring has an outside diameter sized so that it fits closely in the longitudinal bore but can slide longitudinally back and forth in the bore.

A back-up washer 321 is disposed behind the scraper ring 320. Back-up washer 321 has a bore slightly larger than the diameter of the purging rod so that the rod can freely slide through the bore. The outside diameter of this back-up washer is slightly larger than the diameter of the longitudinal bore of cavity 322 so that it is snugly held in an interference fit in the Teflon of the mixing chamber core. The back-up washer 321 is visible from outside the apparatus during use through the open rear end of cavity 322.

As the purging rod is moved rearwardly, any solidified material which has adhered to the purging rod will be scraped off the rod by the scraper ring and deposited in the cavity 322 in front of the scraper ring into space 323, thus helping to prevent accumulation of material on the purging rod. After a number of actuations of the rod, the scraped-off material will begin to build up in space 323 in front of the scraper ring. This build-up of material causes a periodic cocking of the scraper ring and the back-up washer, gradually moving them rearwardly as the dispenser is used and the build-up continues.

Since the back-up washer is visible from outside the apparatus in use, the position of the back-up washer provides a visible indication of the amount of build-up, and hence the condition of the mixing chamber. When the operator observes that the back-up washer has moved rearwardly until it has nearly reached the rear end of cavity 322, it indicates that the mixing chamber should be replaced. Because of this visible indication, mixing chambers can be replaced at appropriate intervals, after the useful life of the mixing chamber has been substantially exhausted but prior to failure of any kind. This is a substantial advantage, since failures otherwise occur at unpredictable times with costly results.

Alternately, scraper ring 320 can be placed rearward of the mixing chamber. In this embodiment, grooves 325 and 330 are provided, respectively, in the mixing chamber support surface 335 and a retainer 340 to hold the scraper ring.

The rear end of the purging rod 315 is detachably connected to the piston rod 155. In one embodiment, the rear end of the purging rod includes a mushroomed portion 345 which detachably fits into a slot 350 formed in the end of piston rod 155, as depicted in FIGS. 9 and 10. Thus, purging rod 315 can be readily removed generally non-axially to the piston rod by lifting the mushroomed end out of the slot 350 at the same time the mixing chamber core 301 is removed, without the need for prior removal of the purging rod from the mixing chamber core. Thus, the purging rod and mixing chamber core can be removed and replaced together as one replaceable unit.

In another embodiment, the purging rod is connected as depicted in FIGS. 1, 2 and 7. When this means of connection is used, piston rod 155 is hollow and extends through rear cover 145 of the air cylinder, where it is sealed against air leakage by seal 350, as well as through the front cover in the manner already described. In this embodiment, the purging rod is of extended length, and has a flattened connection tongue 355 at its rear end. The rear of piston rod 155 includes a rotatable connection nut 360 with a slot 365. The purging rod extends through the hollow piston rod to the rear of the piston rod until the connection tongue 355 extends through slot 365 in the connection nut. Rotating the nut 90° secures the connection tongue to the connection nut. To release the connection tongue, the nut is rotated back 90°. When released, the purging rod can be slid through the hollow piston rod in a generally forwardly direction until it is clear of the piston rod. Because the purging rod has an extended length, and is supported in the hollow piston rod, misalignments of the purging rod have a lesser tendency to rock or dislodge the mixing chamber. This helps to improve the life of the mixing chamber.

After a period of use, the useful life of the mixing chamber of the present invention will become exhausted. In the present invention, the mixing chamber core itself may be removed from the remainder of the apparatus with the purging rod therein. Because the core is very inexpensive, repair or rebuilding is unnecessary. When the mixing chamber becomes unusable for any reason, the core, along with its purging rod is simply discarded, and replaced with a new core and purging rod.

To allow ready removal and replacement of the mixing chamber core, mixing chamber core 301 itself is preferably directly supported by support surfaces 335. When core 301 is in place on the support surfaces, the inlets of the core align with respective exit openings 370 and 370' of the chemical conduits of the chemical valving portion, and are sealed from the outside by means of seals 375 and 375', which are preferably made from Nylon, or other suitable material.

Core is 301 detachably retained on support surfaces 335 by means of retainer 340. Retainer 340 is attached to the remainder of the front of the apparatus by means of bolts 390, although other means of attachment, such as a hinge could be equally well employed. To prevent undesired axial movement of the mixing chamber core during operation of the device, the retainer 340 includes two teeth 395 which enter the deformable core, thus preventing axial movement when the retainer is in place. When the bolts 390 are fastened, retainer 340 firmly holds the mixing chamber core in place, and presses the inlets 305 and 305' into sealing contact with the exit of the chemical conduit.

It is desirable to ensure that the liners 310 and 310' are urged toward the rod 315 to maintain contact between the end of the insert and the rod. Maintenance of such contact prevents the Teflon material of the core from extruding underneath the liner to occlude the inlet. In accordance with the present invention, this is accomplished by pressing against the entrance end of the liner 310 (and 310') with the seal 375 between the exit of the chemical conduit 370 (and 370') and the entrance to the inlet 305 (and 305') when the mixing chamber is in place and retained by means of the retainer 340. Thus, the compression of seal which serves to seal this opening, also serves to urge the liners 310 and 310' into contact with the purging rod 315. In this way, Teflon and other contaminants which might occlude the inlet are prevented from coming between liners 310 and 310' and the purging rod.

The purging rod fits within the bore of the mixing chamber core with substantially no clearance. It is not necessary or desirable to have a significant interference fit between the purging rod and the mixing chamber core, because the purging rod does not need to form a pressure seal against the inlets, and an interference fit increases the force required to move the purging rod. In any event, because Teflon has a tendency to cold-flow, any interference fit which may unintentionally be present is readily dissipated. In addition, an unnecessarily tight interference fit would have a tendency to cause the Teflon to cold-flow.

It is desirable in the present invention to retain the mixing chamber core to the remainder of the apparatus in a circumferentially incomplete way so that stress will not build up between the purging rod and the bore of the mixing chamber core. This is conveniently done by providing a slot 400 between the support faces 335, adjacent the lower corner of the mixing chamber core, into which the core can deform if any significant stress is accidentally developed on the core. Because stresses are not allowed to build up, large frictional forces between the purging rod and the bore of the mixing chamber core are not present. Thus less actuating force is required to reciprocate the purging rod and undesirable cold-flow tendencies are precluded.

The chemical valving portion 500 of the apparatus will now be described. The chemical valving portion 500 includes connections 501 and 501' which receive the connecting end 505 and 505', respectively, of hoses 510 and 510', which are respectively connected to sources of supply of the chemicals to be mixed.

With reference now particularly to FIGS. 4, 5 and 6, a preferred form of the valve means for controlling the flow of each of the chemicals into the mixing chamber will be described. Only one of the respective valve means will be described, however, since the depicted valves for each of the respective chemicals are identical. From the entrance connection 501, the chemical passes into a conduit 515 leading towards a needle valve 520. Needle valve 520 has a stem 525 extending to the exterior of the conduit. The stem 525 has an exterior actuating end 530, and is sealed against leakage to the outside of the apparatus by means of a seal 535. The exterior actuating end 530 of the valve stem 525 passes through a hole 545 in yoke 165, and includes a threaded portion 535 with a nut 540 thereon which is larger than the hole 545 in the yoke. There is space intentionally left between the yoke and nut 540 so that the yoke must be retracted for some distance before it meets nut 540. The nut 540 can be screwed in or out to some degree. Preferably, the nut 540 is adjusted so that both valves open approximately simultaneously.

Instead of attaching the yoke 165 to the piston rod, as depicted in the Figures, the valves can be attached to each other by means of a collar. In this embodiment, the piston rod would be connected to the collar by means of a lost motion linkage, such as a shaft having an enlarged end passing through a hole in the collar, with a space provided between the enlarged end and the collar so that the piston rod would have to be retracted for some distance before it met the collar. The operation of this embodiment would be mechanically essentially the same as the depicted embodiment.

Seal 535 is preferably made of Teflon, or other material which will not be chemically degraded by the chemical. Needle valve 520 has a conical portion 550 which fits into a seat 555. The seat 555 is preferably made of a material which will not be chemically degraded by the chemical being handled, and which will also effectively form a pressure tight seal, such as Teflon.

On the downstream side of seat 555, the conduit includes a filter screen 560 through which the chemical must pass on its way towards the mixing chamber. For convenience, the screen 560 is built into a screen retainer housing 565 which is threadably inserted into the front of the housing by means of threaded nut 570. After passing through the filter screen 560, chemical passes through the exit of the conduit in the support face 335.

A cycle of operation of the mixing and dispensing apparatus will now be described, particularly with reference to FIGS. 2 and 7. Only one of the respective valves 520 (and 520') will be described, since both are identical and should be adjusted to operate substantially simultaneously. FIG. 2 depicts a mixing and dispensing apparatus constructed in accordance with one embodiment of the invention with the purging rod in the fully forward position so that the front of the purging rod is substantially at the front end of the mixing chamber core, which is the position that the purging rod 315 would take when the trigger 115 is not depressed. In this position, the yoke is clear of nut 540. When the yoke 165 is in this forward position, a spring 580 behind the conical nose 550 of the needle valve urges the cone of the needle valve into the seat 555 to form a pressure tight seal, prohibiting fluid flow through the conduit. Of course, the purging rod 315 is connected to the piston rod 155 and moves directly with it. Since both the purging rod and the yoke are mechanically linked to the piston rod 155, the purging rod and the yoke will reciprocate back and forth together.

When the trigger 115 is depressed, the air valve moves rearwardly, compressed air flows to the front of the piston 135, forcing it rearwardly, and in turn retracting the yoke and the purging rod. During the initial portion of this rearward retraction, the valve 580 will remain in the closed position. After the yoke 165 has been moved rearwardly by the piston rod 155 a sufficient distance to use up the space between the yoke and nut 540, the yoke 165 will contact the nut 540. Upon contact of the yoke with the nut 540, valve 580 will open. However, this does not occur until after the purging rod has moved sufficiently rearwardly to fully uncover the inlets 305 (and 305') into the bore of the mixing chamber core.

It is important that the valve 520 not begin to open until the front of the purging rod 315 at least partially uncovers the inlets 305 (and 305') to ensure that the chemical in the inlet directly adjacent purging rod is not under pressure when the rod fully covers the inlet. If this were to occur, the pressurized chemical would tend to seep around the rod to meet with chemical in the other inlet, causing premature reaction and clogging up the ports. After the valves 520 and 520' begin to open, the piston rod 155, yoke 165 and purging rod 315 continue rearwardly to the fully retracted position, depicted in FIG. 7, where the inlets are fully uncovered and the valves are fully opened, permitting fluid to flow through the conduits and, in turn, through the inlets of the mixing chamber and into the bore where the chemicals mix and react and are discharged out the front of the bore.

When the desired quantity of chemical mixture has been dispensed, the trigger 115 is released, causing the air valve 170 to move forwardly and allow exhausting of the air in front of the piston 135 and permitting entry of compressed air behind the piston, thus forcing the piston forward. As the piston rod 155, yoke 165 and purging rod 315 move forwardly, the spring 580 within each valve forces the cone 550 of each valve towards its seat 555. As the yoke continues forwardly, at approximately the position where the valve began to open during the retraction stoke, the conical portion of the valve will meet the valve seat, closing the valve. In this position, the front end of the purging rod 315 is still in a position where is does not fully cover the inlets. Once the conical portion 550 of the valve reaches the valve seat 555 to fully close the valve, thus prohibiting fluid flow, the yoke 165 and purging rod 315 continue forwardly to fully cover the inlet ports 305 (and 305') and extend to substantially the end of the mixing chamber core 301. This action purges the bore of the mixing chamber of any mixture, which if it was allowed to remain, would harden and clog the mixing chamber. Because the air piston 135 moves much faster than is possible for a human hand, and always moves a complete stroke, problems of non-simultaneous and partial opening are eliminated.

Of course, the function of the air piston 135 and cylinder 130 is to provide a motive reciprocating force to move the purging rod 315 and yoke 165 back and forth. If air or other compressed gas is unavailable, however, an electric driver such as a solenoid or a motor, may be substituted. Purely manual means of moving the purging rod and yoke back and forth may also be employed, but because the force required is large in relation to the strength of an average hand, non-manual means are preferred.

Although the invention herein has been described with reference to the drawings and the particular embodiments described, it will be readily appreciated by those skilled in the art that many modifications can be made within the spirit and scope of the present invention and there is no intention by virtue of the foregoing description of excluding any such embodiments as encompassed within the scope and spirit of the present invention as defined by the appended claims.

We claim:

1. An apparatus for mixing and dispensing first and second mutually reactive chemicals, said apparatus comprising a first body portion and a second body portion, said first body portion including a mixing chamber having a front end, a rear end, a longitudinal bore extending therethrough, first and second inlets extending into said bore and positioned between said front end and said rear end, said first and second inlets each having an entrance end and a discharge end, and a purging rod disposed within said bore, said rod having a front end and a rearward portion having connection means thereon and being reciprocal between an extended position wherein said front end of said purging rod extends substantially to the front end of said mixing chamber and a retracted position therein said front end of said purging rod is rearward of said first inlet opening and said second inlet openings;

said second body portion including first and second conduit means for respectively conducting said first and second chemicals, each of said first and second conduit means having entrance means and exit means for its respective chemical, said entrance means including means for connection to its respective source of supply of said chemicals, said exit means including means for sealably and readily detachably connecting said exit means to said entrance end of said inlet; means for reciprocating said purging rod between said retracted position and said extended position, first and second valve means respectively disposed in said first and second conduit means, means responsive to the position of said purging rod for opening said first and second valve means upon retraction of said purging rod to a retracted position at a position where said front end of said purging rod is rearward of at least a portion of both of said first and second inlets; and means responsive to the position of said purging rod for closing said first and second valve means to close said valves upon extension of said purging rod from said retracted position when said front end of said purging rod is still rearward of at least a portion of both of said first and second inlets, and means for maintaining said first and second valves in said closed condition when said front end of said purging rod is forward of said first and second inlets;

said apparatus further including means readily accessible from the outside of the apparatus without disassembly for detachably connecting said reciprocating means to said connection means of said purging rod and means readily accessible from the outside of the apparatus without disassembly for detachably connecting said mixing chamber to said second body portion so that when said purging rod is disconnected from said reciprocating means, said entire first body including both said mixing chamber and said purging rod may be readily detached as a unit from said second body portion, said mixing chamber being constructed of a substantially monolithic piece of deformable material having exposed peripheral sides when said first body portion is readily removed from said second body portion.

2. The device as defined in claim 1, wherein said mixing chamber is a parallelepiped.

3. The apparatus as defined in claim 2, wherein said parallelepiped has a square cross section diagonally oriented with respect to the relative horizontal plane of the apparatus in an upright position.

4. The apparatus as defined in claim 3, wherein said inlets include liners of nondeformable material.

5. The apparatus as defined in claim 4, further including means for continuously urging said liners toward said rod while said mixing chamber is in place on said second body portion.

6. The apparatus as defined in claim 5, wherein said means for urging said liners toward said rod are Nylon seals.

7. The apparatus as defined in claim 1, wherein said deformable material is substantially unconfined at its axial ends.

8. The apparatus as defined in claim 1, wherein said mixing chamber includes a scraper ring in said bore rearward of said inlets.

9. The apparatus as defined in claim 1, wherein said deformable material is polytetrafluoroethylene.

10. The apparatus as defined in claim 1, wherein said means responsive to the position of said purging rod for opening said first and second valve means further includes means for preventing opening of said first and second valve means upon retraction of said purging rod to a retracted position until said front end of said purging rod is completely rearward of both of said first and second inlets.

11. The apparatus as defined in claim 1, wherein said means responsive to the position of said purging rod for opening said first and second valve means upon retraction of said purging rod to a retracted position at a position where said front end of said purging rod is rearward of at least a portion of both of said first and second inlets includes a lost motion device between said means responsive to the position of said purging rod and said first and second valve means.

12. An apparatus for mixing and dispensing first and second mutually reactive chemicals, said apparatus including a mixing chamber portion having a deformable core, said core having a longitudinal bore therethrough, said core having first and second inlets into said bore, each of said inlets having an entrance end and a discharge end.

first and second conduit means for respectively conducting said first and second chemicals, each said conduit means having an entrance end and an exit end, said entrance end including means for connection of said conduit to a source of supply of its respective chemical, said exit end including means for sealably and detachably connecting said exit end of said conduit to said entrance end of said inlet, a rod reciprocally movable within said bore to selectively cover and uncover said inlets, means for reciprocating said rod, means for detachably connecting said reciprocating means to said rod, and means for detachably retaining said deformable core to the remainder of the apparatus so that when said rod is detached from said reciprocating means said core with the rod therein can be readily detached in a non-axial direction from the remainder of the apparatus for replacement purposes, said deformable core having a longitudinal exterior periphery, and said means for detachably retaining said deformable core to the remainder of the apparatus including a longitudinal opening directly adjacent said longitudinal exterior periphery so that said core will be incompletely contained on its longitudinal exterior periphery to minimize build up of stress between said bore of said deformable core and said rod.

13. The apparatus as defined in claim 12, further including liners of nondeformable material lining each of said inlets into said bore and means for urging said liners toward said rod.

14. The apparatus as defined in claim 13, wherein said means for urging said liners toward said rod are Nylon seals.

15. The apparatus as defined in claim 12, wherein said core is constructed of a substantially monolithic piece of deformable material.

16. The apparatus as defined in claim 15 wherein said deformable material is polytetrafluoroethylene.

17. The device as defined in claim 15, wherein said core is a parallelepiped.

18. The apparatus as defined in claim 17, wherein said parallelepiped has a square cross section diagonally oriented with respect to the relative horizontal plane of the apparatus in an upright position.

19. The apparatus as defined in claim 12, wherein said core is substantially unconfined at its axial ends.

20. The apparatus as defined in claim 12, wherein said core includes a scraper ring in said core rearward of said inlets.

21. A mixing chamber for an apparatus for mixing and dispensing first and second mutually reactive chemicals, said mixing chamber having a front mixing portion, a rear scraping portion, and a longitudinal purging rod having a diameter reciprocally movable within said front mixing portion and said rear scraping portion, said front mixing portion having a front longitudinal bore off of a first diameter and first and second inlets for respective reactive chemicals leading into said bore, said first diameter being substantially the same diameter as said rod, said rear scraping portion including a rear longitudinal bore of a second diameter larger than the first diameter of said front longitudinal bore so that there is substantial clearance between said rod and said rear longitudinal bore, a scraper ring slidably positioned in said rear longitudinal bore, said scraper ring having a bore therethrough adapted to receive said purging rod with an interference fit so that any material adhering to said rod will be scraped off as said rod is reciprocated rearwardly and deposited in front of said scraper ring to gradually fill the substantial clearance between said rod and said rear longitudinal bore until said deposits build to the point where the scraper ring is forced slightly rearward; and a back-up washer positioned in said rear longitudinal bore behind said scraper ring, said back-up washer having an interference fit in said rear longitudinal bore and having a bore therethrough adapted to receive said purging rod with a slight clearance therebetween so that as said scraper ring is gradually moved rearward, said scraper ring will gradually move said back-up washer in turn, said back-up washer being visible from the outside of the mixing chamber during use of the apparatus so that the operating can visually determine the position of the back-up washer.

* * * * *